Patented Dec. 2, 1941

2,264,303

UNITED STATES PATENT OFFICE 2,264,303

AZO COMPOUNDS AND MATERIAL COLORED THEREWITH

Joseph B. Dickey, Rochester, N. Y., assignor to Eastman Kodak Company, Rochester, N. Y., a corporation of New Jersey No Drawing. Application March 27, 1940, Serial No. 326,234

9 Claims. (Cl. 260—205)

This invention relates to the art of dyeing or coloring. More particularly it relates to new azo dye compounds, the process for their preparation and the application of the nuclear non-sulfonated compounds for the coloration of organic derivatives of cellulose particularly textile materials made of or containing an organic derivative of cellulose by dyeing, printing, stencilling or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of my invention to provide a new class of azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose such as cellulose acetate-propionate, cellulose acetate-butyrate, and the cellulose ethers such as methyl cellulose, ethyl cellulose or benzyl cellulose. While my invention will be illustrated more particularly in connection with the coloration of cellulose acetate, a material to which the invention is especially adapted, it will be understood that it applies to the coloration of other organic derivatives of cellulose such as those just mentioned.

The azo dye compounds of my invention have the general formula:

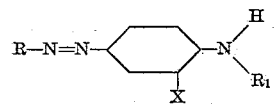

wherein R represents the residue of an aryl nucleus of the benzene series, $R_1$ represents a hydroxyalkyl group containing 2-4, inclusive, carbon atoms and X represents a member selected from the group consisting of chlorine, bromine and fluorine.

In order that my invention may be completely understood it is here noted that $R_1$ includes hydroxyalkyl groups such as $\beta$-hydroxyethyl, $\beta$-hydroxypropyl, $\gamma$-hydroxypropyl, $\beta,\gamma$-hydroxypropyl and $\Delta$-hydroxybutyl, for example.

As previously indicated, the nuclear non-sulfonated azo dye compounds of my invention can be employed for the coloration of organic derivatives of cellulose, such as those hereinbefore mentioned, and constitute exceptionally valuable compounds for this purpose, particularly for the coloration of cellulose acetate silk. Again, for the coloration of organic derivatives of cellulose those compounds in which R is an aryl nucleus of the benzene series containing a nitro group in para position to the azo bond appear to be especially advantageous. The nuclear non-sulfonated dye compounds of my invention likewise possess some application for the coloration of wool and silk and yield generally similar shades on these materials as on cellulose acetate silk. Compounds in which the nucleus R contains a nuclear sulfonic acid group possess little or no utility for the coloration of organic derivatives of cellulose but can be employed to color textile materials such as wool and silk. These nuclear sulfonated compounds can be prepared, for example, in accordance with the teachings of my invention by the use of previously sulfonated diazo components.

I am aware that dye compounds have been prepared by coupling benzene coupling components containing a bromine or chlorine atom in meta position to an amino group with a diazotized arylamine of the benzene series. The dye compounds of my invention are distinguished from these compounds in a number of respects. First the shift in the position of the chlorine or bromine atom from the meta to the ortho position causes a shift in the dyeings yielded by the compounds to the orange. The commercially desirable shades produced with the dye compounds of my invention cannot be obtained with the prior art dye compounds just mentioned. Again, as a general rule, the dye compounds of my invention dye more rapidly than said prior art dye compounds and yield dyeings which are ordinarily more fast to light. The dye compounds of my invention likewise possess the advantage of being dischargeable.

The dye compounds of my invention also possess the advantage of dyeing acetate silk, for example, at low temperatures; temperatures as low as 60° C. being feasible. This factor is of particular importance in jig dyeing operations and leads to lower dyeing costs since less heat is required in the dyeing operation.

In addition to the advantage above mentioned the dye compounds of my invention possess the added advantages of being cheaper to prepare than the corresponding compounds in which the halogen atom is in the meta position to the amino group of the coupling component. To illustrate, coupling components of our invention containing for example a chlorine or bromine atom in ortho position to the amino group are cheaper to prepare than the corresponding coupling components containing a chlorine or bromine atom in the meta position to the amino group since they can be prepared from ortho chloroaniline and ortho bromoaniline rather than the more expensive isomers meta chloroaniline and meta bromoaniline.

The azo dye compounds of my invention can be prepared by diazotizing a primary aminobenzene and coupling the diazonium compound obtained with a coupling compound having the general formula:

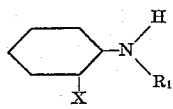

wherein $R_1$ and X have the meaning previously assigned to them.

The following examples illustrate the preparation of the azo dye compounds of my invention:

EXAMPLE I.—*Preparation of p-nitrobenzeneazo-β-hydroxyethyl-o-chloroaniline*

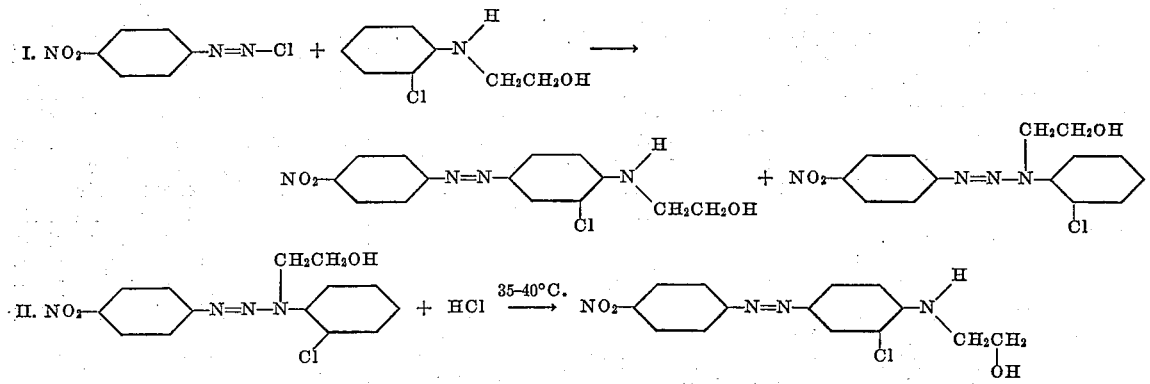

138 grams of p-nitroaniline are dissolved by warming in a mixture of 310 cc. of 36% hydrochloric acid and 600 cc. of water. The solution is then poured onto ice while stirring vigorously and diazotized by adding all at once a solution of 69 grams of sodium nitrite in 250 cc. of water. Concurrently with the preparation of the diazo solution there is prepared a solution of mono-β-hydroxyethyl-o-chloroaniline by adding 172 grams of this compound to a mixture of 100 cc. of 36% hydrochloric acid and 200 cc. of water. 300 grams of ice are added to the resulting mixture following which the diazo solution prepared above is added with stirring. The coupling reaction which takes place is completed by adding sodium carbonate. This coupling reaction requires about two hours.

200 cc. of 36% hydrochloric acid are added to the mixture of azo and azoamino dye formed during the coupling reaction and the mixture is heated with vigorous stirring at a temperature of 30–40° C. (35–40° C. preferred) for 2½–3 hours. The resulting mixture is neutralized with sodium carbonate following which the dye compound formed is recovered by filtration, washed with water and dried. The dye thus obtained is a well defined crystalline compound melting at about 130° C. The yield obtained is in excess of 96% of the theoretical. The dye compound obtained colors cellulose acetate silk an orange shade. The equations numbered I and II given above illustrate the coupling reaction and the conversion of the mixture obtained in the coupling reaction respectively to the desired dye compound.

Equivalent gram molecular weights of mono-β-hydroxyethyl-o-bromoaniline and mono-β-hydroxyethyl-o-fluoroaniline can be substituted for the mono-β-hydroxyethyl-o-chloroaniline of the example to obtain dye compounds which similarly color cellulose acetate silk orange.

EXAMPLE II.—*Preparation of p-nitrobenzeneazo-β-hydroxypropyl-o-chloroaniline*

140 grams of p-nitroaniline are heated in 200 cc. of 36% hydrochloric acid and 200 cc. of water until the amine is dissolved. The solution resulting is allowed to cool to about 35–40° C. following which it is poured with vigorous stirring onto 500 grams of ice. 100 cc. of 36% hydrochloric acid are added immediately following which a solution of 76 grams of sodium nitrite in 150 cc. of water is added very rapidly below the surface of the p-nitroaniline hydrochloric acid mixture. After a few minutes when diazotization is complete, 10 grams of urea are added with stirring and stirring is continued for 15 minutes after which it is found that the temperature of the reaction mixture is about 15° C. The diazo solution is filtered and is then ready for immediate use. The volume obtained is 1300 cc.

Concurrently with the preparation of the diazo solution there is prepared a solution of 185.5 grams of β-hydroxypropyl-o-chloroaniline in 500 cc. of concentrated hydrochloric acid. To this mixture 500 grams of ice water are added with stirring and the diazo solution is then added all at once and the mixture stirred five minutes. After standing for about one hour the mixture is made just acid to Congo red paper by the addition of sodium carbonate. A mixture of azo and azoamino compounds precipitates. The temperature during the addition of the sodium carbonate increases to about 32° C. After precipitation of the azo and azoamino compounds the dye mixture is stirred 15 minutes and then made slightly alkaline to litmus following which it is again stirred for another 15 to 30 minutes. No unreacted diazo compound should be present at this stage. The mixture obtained by this treatment melts at approximately 85° C.

400 cc. of hydrochloric acid are added to the azo and azo-amino mixture and the suspension resulting is stirred at 35-45° C. for several hours. Ice is added and the mixture is slowly neutralized with sodium carbonate during the course of one hour. By this treatment the azo amino compound is converted to the desired dye compound which can now be recovered by filtration, washed with water and dried. The dye compound obtained melts at 104-107° C. and colors cellulose acetate silk an orange shade. The yield obtained is nearly quantitative.

By the substitution of an equivalent gram molecular weight of mono-β-hydroxypropyl-o-bromoaniline and mono-β-hydroxypropyl-o-fluoroaniline for the mono-β-hydroxypropyl-o-chloroaniline of the example, dye compounds which similarly color cellulose acetate silk orange can be obtained.

EXAMPLE III

.1 gram mole of p-nitroaniline is diazotized as described in Example I and the diazonium compound obtained is added to .1 gram mole of glyceryl-o-fluoroaniline dissolved in 10% hydrochloric acid. The reaction mixture is allowed to stand at room temperature for 20-24 hours following which the hydrochloride of the dye which has separated is recovered by filtration and washed with cold water. The crystals thus obtained are suspended in water and warmed to 40° C. with dilute sodium hydroxide following which the dye compound is recovered by filtration, washed with water and dried. The dye compound obtained colors cellulose acetate silk orange.

By the substitution of an equivalent gram molecular weight of glyceryl-o-chloroaniline and glyceryl-o-bromoaniline for the glyceryl-o-fluoroaniline of the example, dye compounds which similarly color cellulose acetate silk orange can be obtained.

EXAMPLE IV 1 gram mole of 1-amino-2-chloro-4-nitroaniline is dissolved in known fashion and the diazonium compound obtained is coupled with 1 gram mole of glyceryl-o-chloroaniline. Coupling and recovery of the dye compound can be carried out in accordance with the teachings of Examples I, II and III. The dye compound obtained colors organic derivatives of cellulose reddish-orange shades.

EXAMPLE V 1 gram mole of p-nitroaniline is diazotized in known fashion and the diazonium compound obtained is added to 1 gram mole of an aqueous acetic acid solution (50-50) of γ-hydroxy-propyl-o-chloroaniline. When p-nitroaniline diazonium chloride can no longer be detected, the mixture is made neutral to Congo red paper by the addition of sodium acetate following which the dye compound formed is recovered by filtration, washed with water and dried. The dye compound obtained colors cellulose acetate silk orange.

Equivalent gram molecular weights of γ-hydroxypropyl-o-bromoaniline and γ-hydroxypropyl-o-fluoraniline can be substituted for the γ-hydroxypropyl-o-chloroaniline of the example to obtain dye compounds which similarly color cellulose acetate silk orange.

The following tabulation further illustrates the compounds included within the scope of my invention together with the color they produce on cellulose acetate silk. The compounds indicated below may be prepared by diazotizing the amines listed under the heading "Amine" and coupling the diazonium compounds obtained with the compounds specified in the column entitled "Coupling component." The diazotization and coupling reactions may, for example, be carried out following the general procedure described in Examples I to V, inclusive.

| Amine | Coupling component | Color |
|---|---|---|
| o-Nitroaniline | (1) β-hydroxyethyl-o-chloroaniline | Yellowish-orange. |
| Do | (2) β-hydroxypropyl-o-chloroaniline | Do. |
| Do | (3) Glyceryl-o-chloroaniline | Do. |
| Do | (4) γ-hydroxypropyl-o-chloroaniline | Do. |
| Do | (5) Δ-hydroxybutyl-o-chloroaniline | Do. |
| Do | (6) β-hydroxy-γ-methoxypropyl-o-chloroaniline | Do. |
| Do | (7) β-hydroxyethyl-o-bromoaniline | Do. |
| Do | (8) β-hydroxypropyl-o-bromoaniline | Do. |
| Do | (9) Glyceryl-o-bromoaniline | Do. |
| Do | (10) γ-hydroxypropyl-o-bromoaniline | Do. |
| Do | (11) Δ-hydroxybutyl-o-bromoaniline | Do. |
| Do | (12) β-hydroxy-γ-methoxypropyl-o-bromoaniline | Do. |
| Do | (13) β-hydroxyethyl-o-fluoraniline | Do. |
| Do | (14) β-hydroxypropyl-o-fluoraniline | Do. |
| Do | (15) Glyceryl-o-fluoraniline | Do. |
| Do | (16) γ-hydroxypropyl-o-fluoraniline | Do. |
| Do | (17) Δ-hydroxybutyl-o-fluoraniline | Do. |
| Do | (18) β-hydroxy-γ-methoxypropyl-o-fluoraniline | Do. |
| p-Aminoacetophenone | Coupling components 1-18 | Do. |
| o-Aminophenylmethyl sulfone | ----do---- | Do. |
| 1-amino-2-nitro-4-chloroaniline | ----do---- | Orange. |
| 1-amino-2-nitro-4-bromoaniline | ----do---- | Do. |
| 1-amino-2-methyl-4-nitrobenzene | ----do---- | Do. |
| 1-amino-2-methoxy-4-nitrobenzene | ----do---- | Do. |
| p-Nitroaniline | ----do---- | Do. |
| p-Aminoazobenzene | ----do---- | Do. |
| p-Aminophenylmethyl sulfone | ----do---- | Do. |
| p-Aminobenzene ethyl sulfonamide | ----do---- | Do. |
| 1-amino-2,4-dinitrobenzene | ----do---- | Rubine. |
| 1-amino-2,4-dinitro-6-chlorobenzene | ----do---- | Do. |
| 5-nitro-2-aminophenylmethylsulfone | ----do---- | Red. |
| o-Chloroaniline | ----do---- | Yellowish-orange. |

Suitable sulfonated amines which can be diazotized and coupled with the coupling components of my invention include, for example, m-sulfanilic acid, p-sulfanilic acid, 1-amino-2-sulfo-4-nitrobenzene, 1-amino-2-nitro-4-sulfobenzene, 1-amino-2-chloro-4-sulfobenzene and 1-amino-2-sulfo-4-bromobenzene.

The coupling components employed in the preparation of the dye compounds of my invention can be prepared from o-(chloro, bromo, fluoro-)-aniline by known methods for the replacement of a hydrogen atom of an amino group with a hydroxy-alkyl group. To illustrate, a β-hydroxyethyl group can be introduced by reaction with ethylene oxide, a β-hydroxypropyl group can be introduced by reaction with propylene oxide and a γ-hydroxypropyl group can be introduced by reaction with trimethylene oxide.

The nuclear non-sulfonated dye compounds of my invention can be employed for the coloration of organic derivatives of cellulose by the well known dispersion methods for applying water-insoluble or substantially water-insoluble dyes to such materials. For a more complete description reference may be had to McNally and Dickey U. S. Patent No. 2,115,030, issued April 26, 1938. The nuclear sulfonated dye compounds can be employed to dye wool and silk in accordance with the methods well known to the wool and silk dyeing art.

I claim:
1. The azo dye compounds having the general formula:

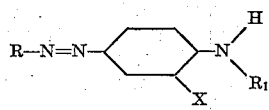

wherein R represents the residue of an aryl nucleus of the benzene series, $R_1$ represents a hydroxyalkyl group containing 2-4, inclusive, carbon atoms and X represents a member selected from the group consisting of chlorine, bromine and fluorine.

2. The nuclear non-sulfonated azo dye compounds having the general formula:

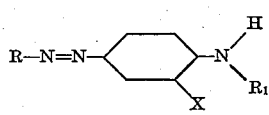

wherein R represents the residue of an aryl nucleus of the benzene series, $R_1$ represents a hydroxyalkyl group containing 2-4, inclusive, carbon atoms and X represents a member selected from the group consisting of chlorine, bromine and fluorine.

3. The nuclear non-sulfonated azo dye compounds having the general formula:

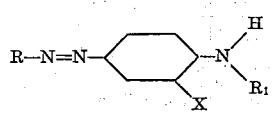

wherein R represents the residue of an aryl nucleus of the benzene series containing a nitro group in para position to the azo bond shown, $R_1$ represents a hydroxyalkyl group containing 2-4, inclusive, carbon atoms and X represents a member selected from the group consisting of chlorine, bromine and fluorine.

4. The nuclear non-sulfonated azo dye compounds having the general formula:

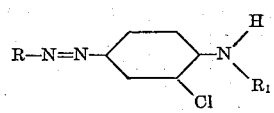

wherein R represents the residue of an aryl nucleus of the benzene series and $R_1$ represents a hydroxyalkyl group containing 2-4, inclusive, carbon atoms.

5. The nuclear non-sulfonated azo dye compounds having the general formula:

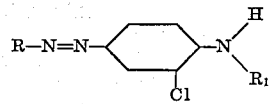

wherein R represents the residue of an aryl nucleus of the benzene series containing a nitro group in para position to the azo bond shown and $R_1$ represents a hydroxyalkyl group containing 2-4, inclusive, carbon atoms.

6. The nuclear non-sulfonated azo dye compounds having the general formula:

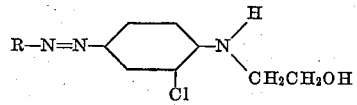

wherein R represents the residue of an aryl nucleus of the benzene series.

7. The nuclear non-sulfonated azo dye compounds having the general formula:

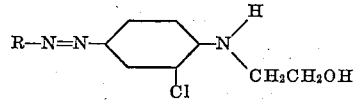

wherein R represents the residue of an aryl nucleus of the benzene series containing a nitro group in para position to the azo bond shown.

8. The azo dye compound having the formula:

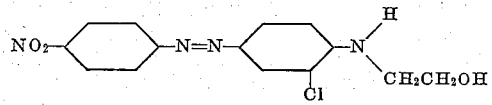

9. The process of preparing azo dye compounds having the general formula:

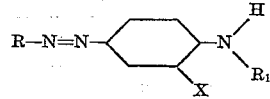

wherein R represents the residue of an aryl nucleus of the benzene series, $R_1$ represents a hydroxyalkyl group containing 2-4, inclusive, carbon atoms and X represents a member selected from the group consisting of chlorine, bromine and fluorine which comprises coupling a diazotized arylamino compound of the benzene series with a coupling component having the general formula:

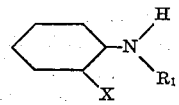

wherein $R_1$ and X have the meaning previously assigned to them, said coupling reaction being carried out by reacting a diazotized arylamino compound of the benzene series with a coupling compound having the formula above given in a cold acid solution, neutralizing the reaction mixture by adding an alkali-metal salt of a weak acid whereby coupling is completed, adding a mineral acid to the reaction mixture and heating the reaction mixture with stirring at about 30–40° C. until any azoamino dye formed in the coupling reaction is converted to the desired dye compound, neutralizing the reaction mixture resulting with an alkali-metal salt of a weak acid and recovering the desired dye compound formed by filtration.

JOSEPH B. DICKEY.